United States Patent
Cohen et al.

(10) Patent No.: US 8,863,921 B2
(45) Date of Patent: Oct. 21, 2014

(54) 360-DEGREE FREEDOM ELECTRIC CORD DEVICE AND SYSTEM

(76) Inventors: Abraham Cohen, St-Laurent (CA); Aharon Kot, Outremont (CA)

( * ) Notice: Subject to any disclaimer, the term of this patent is extended or adjusted under 35 U.S.C. 154(b) by 402 days.

(21) Appl. No.: 12/926,427

(22) Filed: Nov. 17, 2010

(65) Prior Publication Data

US 2011/0266383 A1 Nov. 3, 2011

Related U.S. Application Data

(60) Provisional application No. 61/330,074, filed on Apr. 30, 2010.

(51) Int. Cl.
| | |
|---|---|
| *B65H 75/44* | (2006.01) |
| *B65H 57/26* | (2006.01) |
| *B65H 57/14* | (2006.01) |
| *B65H 75/42* | (2006.01) |
| *B65H 57/10* | (2006.01) |

(52) U.S. Cl.
CPC ............ *B65H 57/10* (2013.01); *B65H 2701/34* (2013.01); *B65H 57/26* (2013.01); *B65H 75/4471* (2013.01); *B65H 57/14* (2013.01); *B65H 75/425* (2013.01)
USPC ...................................... 191/12.2 R; 242/398

(58) Field of Classification Search
USPC ................... 191/12 R, 12.2 R, 12.4; 180/2.1; 242/370, 388, 398, 557, 558
See application file for complete search history.

(56) References Cited

U.S. PATENT DOCUMENTS

| | | | | |
|---|---|---|---|---|
| 1,514,148 A | * | 11/1924 | Forssblad | .................... 191/12 R |
| 3,375,338 A | | 3/1968 | Delf | |
| 4,395,053 A | | 7/1983 | Kalfas | |
| 4,587,383 A | * | 5/1986 | Stoldt | ......................... 191/12 R |
| 4,667,460 A | | 5/1987 | Kramer | |
| 5,730,397 A | | 3/1998 | Van Niekerk | |
| 2009/0178895 A1 | | 7/2009 | Vannest | |

FOREIGN PATENT DOCUMENTS

| | | |
|---|---|---|
| DE | 2409792 | 9/1975 |
| DE | 20116052 U1 | 1/2002 |
| GB | 536579 A | 5/1941 |
| GB | 2420772 A | 6/2006 |

\* cited by examiner

*Primary Examiner* — R. J. McCarry, Jr.
(74) *Attorney, Agent, or Firm* — Equinox IP; Franz Bonsang (57) ABSTRACT

A 360-degree freedom electric cord device system contains and manages automatic extension and retraction of an electric cord/cable supplying power to a push/pull-type electric machine, either self-propelled or not, for intended displacement or steering on a surface by a user. The 360-degree freedom electric cord device system, partly mounted on the electric machine, allows the power cord to clear obstacles on the surface and includes a self-retracting spool to automatically extend and rewind the power cord and continuously keeps physical tension therein, in a straight line and a natural position, during the displacement in any direction of the electric machine. With a ratchet mechanism, the device can also suitably be used independently of the machine as an electric retractable extension cord reel.

22 Claims, 6 Drawing Sheets

360-DEGREE FREEDOM ELECTRIC CORD DEVICE AND SYSTEM

CROSS REFERENCE TO RELATED APPLICATION

Benefit of U.S. Provisional Application for Patent Ser. No. 61/330,074 filed on Apr. 30, 2010, which is incorporated herein by reference, is hereby claimed.

FIELD OF THE INVENTION

The present invention relates to power cord systems, and is more particularly concerned with a 360-degree freedom electric cord system for use with a push/pull-type electric machine displaceable on a surface by a user/operator that contains and manages automatic extension and retraction of the electric cord/cable supplying power thereto. The 360-degree freedom electric cord system, mounted on the electric machine, allows the power cord to continuously power the electric machine while freeing up the operator's hands to entirely focus on the operation of the machine and includes a self-retracting spool to automatically extend and rewind the power cord and continuously keeps tension therein during the displacement, in any direction, of the electric machine, according to the operator's desirable intent.

More specifically, the invention of the 360-degree freedom electric cord system (device) is an electrical retractable cord (cable) reel device system planned, developed and intended to be installed (by the operator) onto existing motorized (or mobile) push machines or installed permanently by the manufacturer on or into newly manufactured motorized (or mobile) or used push machines. The 360-degree freedom electric cord system (device) provides an electric power cord (cable) extension for (any) electric user push (motorized) machines which are directed by the operator's desired intent, i.e. forwards (push mode), backwards (pull mode), straight, right, left, square, rectangle, circle 360 degrees, spiral, octave, etc.

BACKGROUND OF THE INVENTION

Most electric machines displaceable by a user on a surface, either push/pull-type (pushed or pulled by a user) or being motorized for self propulsion or the like, which are steered by a user, require an electric cord or cable extension to supply power to the machine for operation thereof. Although these electrical machines, such as lawnmowers, floor cleaners, carpet cleaners, vacuum cleaners, garden & yarn machines, snow blowers, floor working (as industrial scrubbers) and floor finishing machines or the like, are less polluting than corresponding fuel consuming ones or even than battery-powered ones, they have the disadvantage of having an electric cord or wire to supply power thereto, and it is time consuming and cumbersome to take care of the electric wire following the machine by continuously watching and/or holding it to ensure it does not get damaged or stuck to an obstacle lying on the surface.

Accordingly, there is a need for an improved electric cord device system.

SUMMARY OF THE INVENTION

It is therefore a general object of the present invention to provide an improved electric cord device system.

An advantage of the present invention is that the electric cord device allows a user to freely displace or steer a push/pull-type electric machine on a surface without releasing him from continuously handling the power supply electric cord or cable from side to side while the machine operates and moves in any direction, thus saving operating time without having to stop the machine.

Another advantage of the present invention is that the cord device allows a 360-degree freedom for the steering (displacement) of the electric machine, with a continuously self-adjusting cord length, in generally straight line, between the electric machine and the region adjacent the power wall outlet, thereby freeing the attention and the hands of the user during operation of the machine.

A further advantage of the present invention is that the cord device keeps the electric cord or cable into a natural position/orientation under tension above the surface and obstacles thereon without stopping the machine operation, thereby ensuring user safety, and also prevents twisting of the electric cord.

Still another advantage of the present invention is that the cord device has the electric cord wound around a self-retractable spool to ensure the tension in the electric cord, as well as the automatic extension and retraction thereof while the working electric machine is operating and being displaced on the surface, with the power cord unwinding from the spool when the machine is displaced away from fixed structure and its power outlet, and, reversely, with the power cord rewinding on the spool when the machine approaches the fixed structure, thus enabling any type of movement of the electric machine during operation.

Another advantage of the present invention is that the cord device can be adapted to any push/pull-type electric machine, and mounted either on the machine (as a retrofit), via a stand holder or directly secured to the machine, or inside the machine, installed by the machine manufacturer.

A further advantage of the present invention is that the cord device includes a cord holder member that can be adapted to releasably mount on different rigid structures, depending on the location, as in restricted areas, built-up areas, indoors, outdoors, outside or inside of the structure, open area, hallway, corridor with lower ceiling, in/out of the building, or the like, and the use of the electric machine carrying the device.

Yet another advantage of the present invention is that the cord device can be configured for indoor and/or outdoor use, have models adapted for different gauge extension cords used on different residential, commercial or industrial push/pull-type electric machines.

Still a further advantage of the present invention is that the cord device can be serviceable as a standard electric retractable extension cord reel, for other electric hand tools or the like electrical devices, when on or in the electric machine, and can also be serviceable when off a machine, and being adaptable to mount on the ground, on the wall or hanging from a rigid structure in such cases.

Still another advantage of the present invention is that the cord device prevents accidental unplugging of the power cord from the wall power outlet because of the cord holder member.

According to an aspect of the present invention, there is provided a 360-degree freedom electric cord device for receiving an electric cord and for using with a push/pull-type electric machine displaceable by a user on a surface, said device comprising:

a housing member mountable on a displaceable electric machine and having a self-retracting spool member for housing a first end portion of an electric cord connectable to the electric machine;

an elongated post member defining a post member axis and first and second post member ends longitudinally opposed from one another, said first post member end connecting to the housing member, said post member having a through bore extending therealong between said first and second post member ends for receiving a central portion of the electric cord therein, said second post member end having a cord guiding member for allowing the electric cord to extend substantially radially therefrom and to freely rotate within a 360-degree span angle about the post member axis; and a cord holder member connectable to a structure for supporting a second end portion of the electric cord adjacent thereto and away from said post member, said cord holder member including a cord state holder mechanism connectable to the electric cord for preventing torsion twisting thereof.

Typically, the post member is adjustable in length.

In one embodiment, the cord guiding member is an outwardly enlarging diameter of said through bore at said second post member end in a direction extending away from said first post member end.

Conveniently, the outwardly enlarging diameter of said through bore at said second post member end forms a bell-shaped second post member end.

Typically, the bell-shaped second post member end includes an outwardly rounded edge.

In one embodiment, the cord guiding member includes a cord pulley freely rotatably mounted on a hollow bracket swiveling on said post member about said post member axis, said cord pulley being located radially away from said post member axis and within a pulley plane including said post member axis.

Conveniently, the cord guiding member includes a pulley cord guide adjacent said cord pulley for maintaining the electric cord circumferentially in contact therewith.

Typically, the cord pulley is a first cord pulley, the pulley cord guide being a second cord pulley freely rotatably mounted on said hollow bracket adjacent said first cord pulley for operatively receiving the electric cord therebetween such that each said cord pulley being said pulley cord guide for the other said cord pulley, said first and second cord pulleys being within said pulley plane.

In one embodiment, the housing member includes a main housing containing said self-retracting spool member therein and attaching to a mounting bracket, said mounting bracket mounting on a stand holder for attachment to a displaceable electric machine.

Conveniently, the mounting bracket is pivotally mounted on the stand holder about an axis generally parallel to a spool axis of said self-retracting spool member for angular adjustment relative thereto so as to allow said post member axis to remain in a generally vertical orientation when said stand holder is attached to the displaceable electric machine.

Typically, the stand holder is adjustable in length for adjusting to actual dimensions of the displaceable electric machine.

Conveniently, the self-retracting spool member includes a spool freely rotatable on a fixed spool shaft with a torsion spring therebetween, whereby said torsion spring always maintaining a tension into an electric cord wound therearound.

Conveniently, the self-retracting spool member includes a selectively operable ratcheting mechanism mounted between said main housing and said spool, and connecting thereto, to selectively restrain rotation of said spool into one direction allowing unwinding of an electric cord wound therearound, said ratcheting mechanism selectively preventing operation of said torsion spring.

Typically, the main housing is a waterproof housing.

In one embodiment, the cord holder member includes a cord clamp member for clamping on an electric cord, and a securing member for releasable securing of said cord holder member to a structure, said cord clamp member connecting to the securing member via the cord state holder member.

Conveniently, the cord state holder member includes a helical tension spring having opposite ends connecting to said cord clamp member and said securing member.

Conveniently, the cord state holder member includes a tension limiter having opposite ends connecting to said cord clamp member and said securing member, said tension limiter being mounted in parallel to said helical tension spring.

Typically, the cord state holder member includes a generally flexible spring cover housing said helical tension spring therein.

Conveniently, the securing member includes a fastener for releasable fastening to a structure. Typically, the fastener is a hook or a suction cup.

According to another aspect of the present invention, there is provided a 360-degree freedom electric cord system for using with a push/pull-type electric machine displaceable by a user on a surface, said system comprising:

a housing member mountable on a displaceable electric machine and having a self-retracting spool member housing a first end portion of an electric cord connectable to the electric machine;

an elongated post member defining a post member axis and first and second post member ends longitudinally opposed from one another, said first post member end connecting to the housing member, said post member having a through bore extending therealong between said first and second post member ends receiving a central portion of the electric cord therein, said second post member end having a cord guiding member allowing the electric cord to extend substantially radially therefrom and to freely rotate within a 360-degree span angle about the post member axis; and a cord holder member connectable to a structure supporting a second end portion of the electric cord adjacent thereto and away from said post member, said cord holder member including a cord state holder mechanism connecting to the electric cord to prevent torsion twisting thereof.

According to a further aspect of the present invention, there is provided a push/pull-type electric machine displaceable by a user on a surface, said electric machine comprising a 360-degree freedom electric cord device, said device including:

a housing member mountable on a displaceable electric machine and having a self-retracting spool member housing a first end portion of an electric cord to power the electric machine;

an elongated post member defining a post member axis and first and second post member ends longitudinally opposed from one another, said first post member end connecting to the housing member, said post member having a through bore extending therealong between said first and second post member ends receiving a central portion of the electric cord therein, said second post member end having a cord guiding member allowing the electric cord to extend substantially radially therefrom and to freely rotate within a 360-degree span angle about the post member axis; and a cord holder member connectable to a structure supporting a second end portion of the electric cord adjacent thereto and away from said post member, said cord holder member including a cord state holder mechanism connecting to the electric cord to prevent torsion twisting thereof.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 5 is a perspective view of the embodiment of FIG. 1, with components removed for attachment to a ceiling structure or the like;

DETAILED DESCRIPTION OF THE PREFERRED EMBODIMENTS

With reference to the annexed drawings, the preferred embodiments of the present invention will be herein described for indicative purpose and by no means as of limitation.

Referring now to FIGS. 1 through 5, there is schematically shown an embodiment of 360-degree freedom electric cord device, shown generally as 20, for receiving an electric power cord or cable 10, preferably provided therewith to form a 360-degree freedom electric cord system, and for using with a push/pull-type electric machine 12 displaceable by a user 14 on a surface 16, which could be the floor, the ground or the like. The push/pull-type electric machine 12 refers to any electric machine intended to be pushed or pulled by a user 14 on a corresponding surface 16, such as, but not limited to, a lawnmower, floor cleaner, carpet cleaner, vacuum cleaner, garden or yarn machine, snow blower, floor working or floor finishing machine, scrubber or the like.

Figure 1:
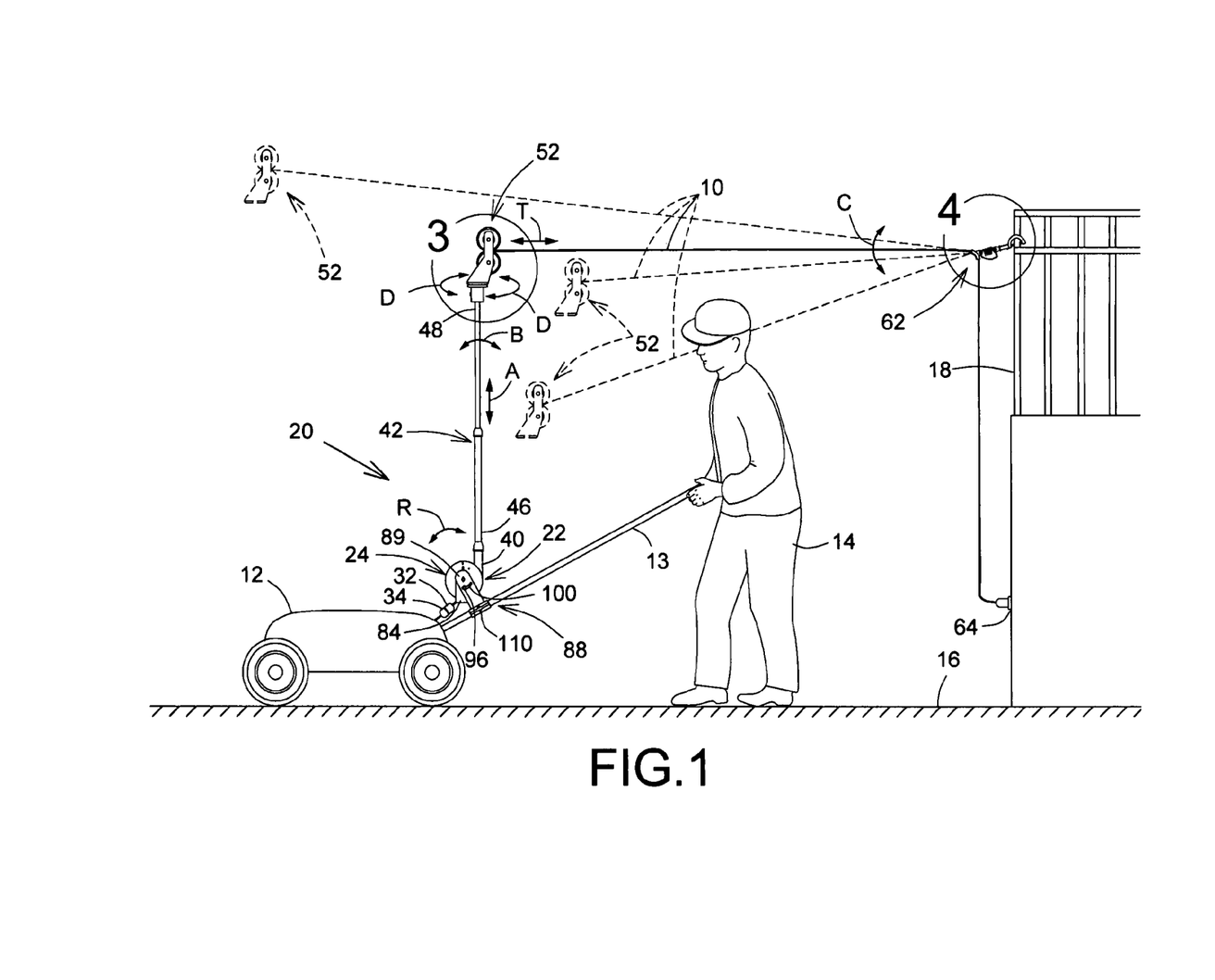
FIG. 1 is an elevation illustration of the use of a 360-degree freedom electric cord device in accordance with an embodiment of the present invention, mounted on a push/pull-type electric machine displaceable by a user on a surface.

As shown in FIG. 1, the device 20 allows the user 14 to freely displace the electric machine 12 on the surface 16 without having to worry about the power cord 10 by ensuring that the cord 10 always remains in tension, with automatic continuous extension and retraction (as shown by arrow T), at a height generally above any obstacle (not shown), which could be chairs, tables, small trees, plants, fences, racks for goods, or the like, and preferably including the user 14 him/herself, located on the surface 16, in a substantially horizontal orientation between the electric machine 12 and a fixed structure 18 nearby, and does not twist on itself while randomly displacing the machine 12 during operation.

The main component 22 of the device 20 is the housing member that includes a main housing 24, typically made out of two or three parts, that houses a self-retracting spool member 26 receiving a first proximal end portion of the power cord 10 wound there around. As in typical self-retracting spools, the self-retracting spool member 26 includes a spool 28 freely rotatably mounted on a fixed shaft 30 defining a spool axis 31 and fixedly secured to the main housing 24 (see FIG. 6), and is connected thereto via a spiral rewind torsion spring (not shown) used to bias the spool 28 to rotate in a direction to rewind the power cord 10 there around. The size of the spiral spring may vary depending on the type and weight of the electric machine 12, as well as with the gauge of the power cord 10, such that the entire device 20, along with the weight of the machine 12 function as a whole, and the device 20, and especially the self-retracting spool 28, does not function and remains stationary when the machine 12 is on hold, not in movement. The proximal end of the power cord 10 is typically connected to a conventional receptacle of a proximal machine power cord 32 connectable to the power cord 34 of the electric machine 12, via a conventional reel electrical power interface (not shown) which could include an electrical switch (not shown) for selectively close or open the electrical connection there through.

During normal operation of the electric machine 12 with the present device 20, the self-retracting spool member 26 is in a normally open configuration in which the spiral spring continuously biases the spool 28 to rewind the power cord 10. Typically, the self-retracting spool member 26 includes a mechanical restraint component system such as a ratchet mechanism 36 selectively activatable, and deactivatable, by the user 14. The ratchet mechanism 36 typically includes a conventional spring loaded latch pawl (not shown) mounted on the main housing 24 via an axially biased pawl shaft (not shown) and meshable (engageable) with a corresponding conventional ratchet toothed wheel or ring (not shown) mounted on the on the spool 28. Via a configuration knob 38 extending from the pawl shaft, the user can selectively unlatch the pawl for spring biased engagement with the ratchet wheel to have the self-retracting spool member 26 in a closed configuration, identified by corresponding first mark 38c on the main housing 24, in which the ratchet mechanism 36 is in operation to allow rotation of the spool 28 in a direction to unwind the power cord 10 therefrom while selectively preventing and allowing its rotation in the opposite direction under the biasing action of the spiral spring, depending on the stopping position of the spool (or the pawl angular position relative to the ratchet wheel). When the knob 38 is returned back into the latched position, the pawl is axially displaced and disengaged from the ratchet wheel to allow the continuous self-retracting operation of the spool member 26 in the open configuration, identified by corresponding second mark 38o on the main housing 24. It is noted that the closed configuration would preferably be used when installing the device 20, especially the cord holder member 62 described hereinafter.

The main housing 24 typically includes a hollow branch 40 extending therefrom with a cord access opening 41 being generally tangentially oriented relative to the spool 28 to allow the power cord 10 to tangentially unwind therefrom in a generally upward direction into an elongated post member 42 mounted onto the main housing 24. The elongated post member 42 generally defines a post member axis 44 and first proximal 46 and second distal 48 post member ends longitudinally opposed from one another. The proximal post member end 46 is typically mounted on and inserted into the main housing branch 40 up until it abuts or sits on an inner bulge 40' or the like, preferably annular, and is secured thereto via a fastener such as screw 47 or the like. The post member 42 has a through bore 50 extending therealong between the post member ends 46, 48 to receive a central portion of the power cord 10 therein. The post member 42 is typically adjustable in length, such as a telescopic rod, to allow an adjustment of the height of the power cable 10 extending between the fixed structure 18 and the electric machine 12, especially in the region nearby the machine 12, as shown by arrow A. Furthermore, the post member 42 is preferably slightly flexible, due to its inherent elongated structure and materials used for its components, to allow small deflections of the distal end 48 in a direction perpendicular to its axis 44 to prevent damages thereto and smooth functioning of the device 20, as shown by arrow B.

Figures 3, 3A:
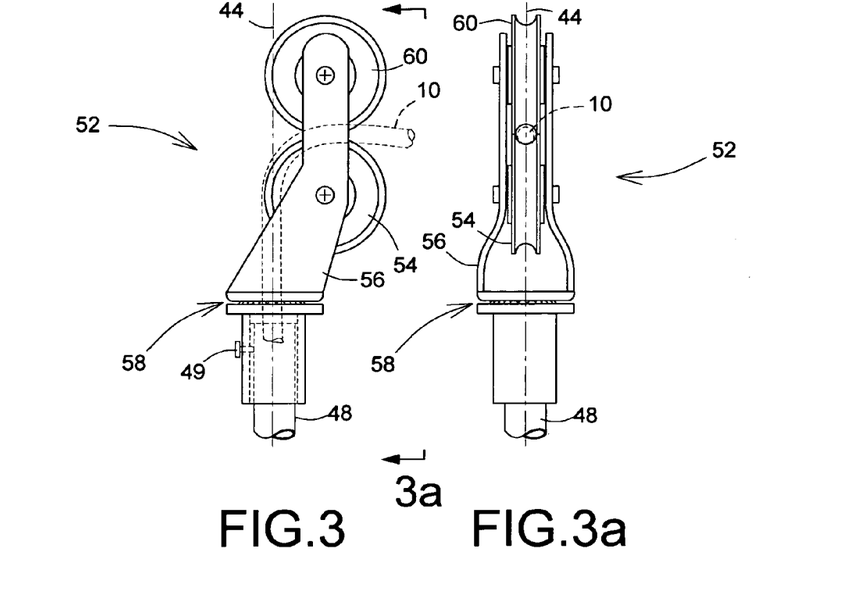
FIG. 3 is a partially broken enlarged view taken along line 3 of FIG. 1.
FIG. 3a is a partially broken enlarged view taken along line 3a-3a of FIG. 3.

As shown more specifically in FIGS. 1, 3 and 3a, the distal post member end 48 includes a cord guiding member 52, typically secured thereto via a fastener such as screw 49 or the like, to guide the electric cord 10 in a substantially radial direction relative to the post member axis 44, which could substantially vary from the horizontal direction as shown by arrow C and the stippled lines, and to freely rotate within a 360-degree span angle about the post member axis 44, such that the electric cord can freely extend from the post member 42 toward a cord holder member 62 (see below) that is located in any direction over the 360-degree span relative thereto, as represented by arrows D. The cord guiding member 52, best suited to guide small to medium gauge (low duty—mostly residential grade) power cords, typically includes a first lower cord pulley 54 freely rotatably mounted on a hollow bracket 56 that swivels on the distal post member end 48 about the post member axis 44 via a hollow bearing 58 or the like. The lower cord pulley 54 is located radially away from the post member axis 44 and within a pulley plane that includes the post member axis 44. A pulley cord guide 60, here in the form of a second upper cord pulley, adjacent the lower cord pulley 54 maintains the power cord 10 circumferentially in contact therewith. The upper cord pulley 60, also freely rotatably mounted on the hollow bracket 56 and in the same pulley plane, and the lower pulley 54 operatively receive the electric cord therebetween, such that each cord pulley 54, 60 is essentially the pulley cord guide for the other cord pulley 60, 54.

Figure 4:
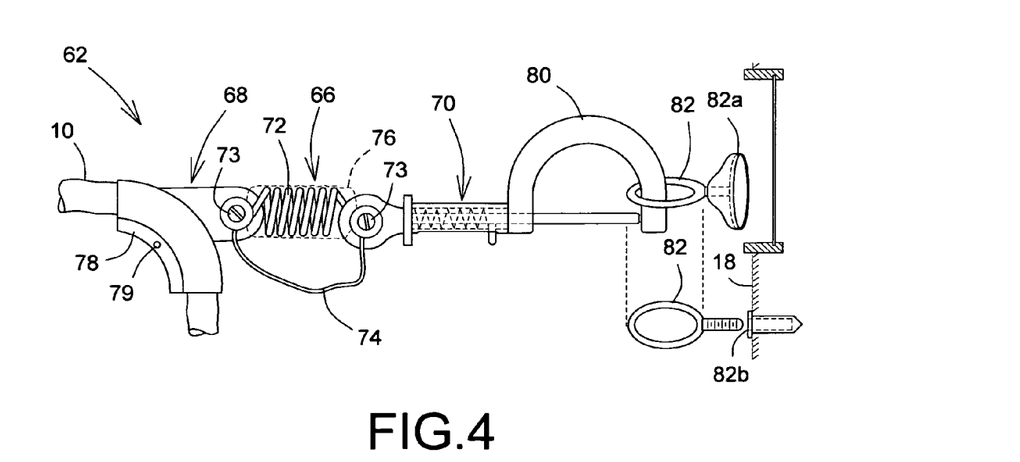
FIG. 4 is a partially broken enlarged view taken along line 4 of FIG. 1, showing alternate structure anchors.

As shown more specifically in FIGS. 1 and 4, the 360-degree freedom electric cord device 20 typically includes a cord holder member 62, also referred to as the electric cord holder multi system since it performs multiple functions, that connects to the fixed structure 18 and that supports a distal second end portion of the power cord 10 adjacent the fixed structure 18 nearby (typically with a distance of 10 feet (3 meters) or less) an electrical power source, such as a conventional convenience wall power outlet 64, and away from the post member 42. The cord holder member 62 is typically located at a selected height sufficient to ensure the substantially horizontal orientation of the cord 10 between the cord holder member 62 and the cord guiding member 52 during operation of the device 20, and substantially ensures a continuous holding of a natural untwisted torsion twisting of the power cord 10 there between. The cord holder member 62 includes a cord state holder mechanism 66 connecting between a cord clamp member 68 to clamp the power cord, and a securing member 70 to secure the cord holder member 62 to the fixed structure 18.

The cord state holder member 66, which maintains natural twist orientation (and substantially prevents torsion twisting) of power cord 10 between the cord guiding member 52 and the cord holder member 62 to keep the cord 10 in a natural position/orientation while also helping in maintaining tension therein (two physical states of the power cord 10 essential to ensure a proper operation of the self-retracting spool member 26, along with the allowed small deflection B of the post member 42), typically includes a helical tension spring 72 having opposite ends, typically fixedly, connecting to the cord clamp member 68 and the securing member 70, using bolt fasteners 73 or the like, to prevent free (unrestricted) twisting of the spring 72 relative thereto. The cord holder member 62, and more specifically the cord state holder member 66 allow, in operation, a continuous forward and rearward shaking of the cord 10 (and consequently of the post member 42) to ensure the proper functioning of the self-retracting spool member 26, especially the natural rewinding of the cord 10 on the spool 28. Additionally, the cord holder member 62 prevents accidental unplugging of the power cord 10 from wall power outlet 64. In order to prevent damages to the helical tension spring 72, the cord state holder member 66 includes a tension limiter 74, preferably in the form of a small metallic cable or the like, of a pre-determined length slightly longer than the helical spring 72 when in the released state (to ensure a limited extension thereof), that has its opposite ends connecting also to both the cord clamp member 68 and the securing member 70, preferably via bolt fasteners 73, in parallel to the helical tension spring 72. To protect the helical spring 72 from environmental conditions as well as the prevent injuries with the helical spring 72, the cord state holder member 66 further includes a flexible (or stretchable) spring cover 76 (shown in stippled lines in FIG. 4) generally housing the helical tension spring 72 therein.

The cord clamp member 68 is typically in the form of two half-tubular sleeves 78 attachable to one another, via bolt fastener 79 or the like, with the power cord 10 secured in-between and typically curved (of about 90 degrees in the present case, but could be any angle, even zero degree) to properly maintain the power cord 10 in both the substantially horizontal orientation towards the post member 42 and the substantially vertical orientation towards the wall power outlet 64 adjacent the surface 16 and the fixed structure 18.

The securing member 70 includes a structure fastener 80 to releasably attach the cord holder member 62 to the fixed structure 18. The fastener 80 could be in the form of a closable hook directly fastening to the fixed structure 18, as a hand rail or the like, as shown in FIG. 1. Also, the fastener could include an anchor 82 in the form of either a hookable suction cup 82a securable to a fixed planar surface structure as a window or the like, or a wall anchor 82b fixed to the structure 18, as shown in FIG. 4, although other securing fasteners 80 are possible.

Figure 2:
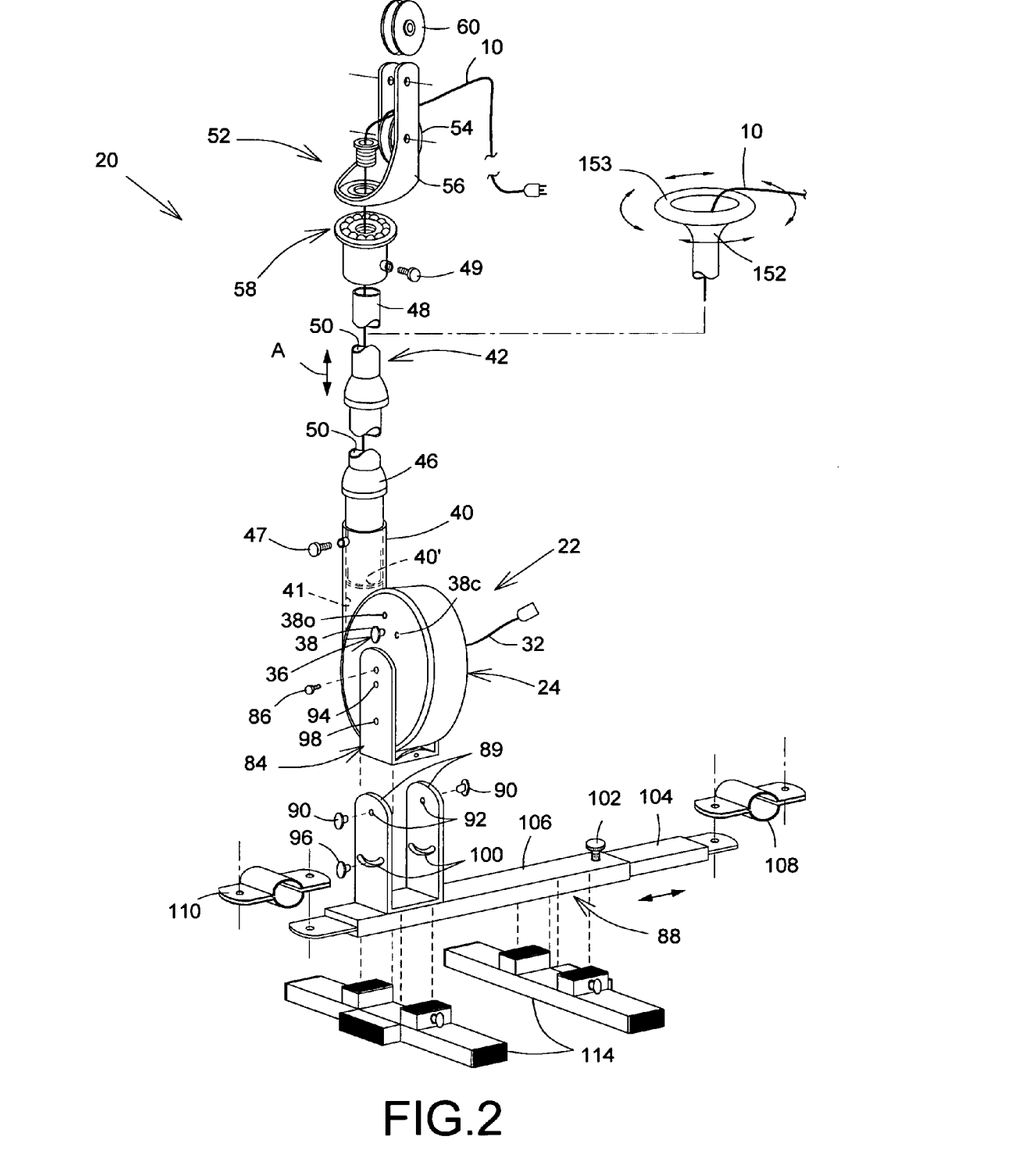
FIG. 2 is a partially broken exploded perspective view of the embodiment of FIG. 1, showing the device mounting bracket adapted on an adjustable stand holder attaching to the electric machine, the holder being alternatively mountable on an optional mounting base.

Now referring more specifically to FIGS. 1 and 2, the housing member 22 further includes a mounting bracket 84, of a generally U-shape, attached to the main housing 24 via fasteners 86 fastening to the fixed shaft 30 between the two sides of the U-shape, and typically mounting on a stand holder 88 via fasteners 90, such as screws or the like engaging corresponding holder through holes 92 and bracket blind holes 94, the stand holder 88 being attachable to a push/pull-type electric machine 12.

The mounting bracket 84 is preferably pivotally mounted on preferably two respective side plates 89 of the stand holder 88 positioned in superposition onto the corresponding two sides of the U-shape, about an axis generally parallel to a spool axis 31 for angular adjustment relative thereto so as to allow the post member axis 44 to remain in a generally vertical orientation when the stand holder 88 is attached on the an angled component 13 of the electric machine 12, such as the handles of a lawnmower, as in FIG. 1. The angular adjustment, as shown by arrow R, is made possible via a bolt 96 securing to a corresponding bolt hole 98 of one of the two sides of the U-shape and being selectively positionable within a corresponding arcuate slot hole 100 of the stand holder 88.

In order to adapt the stand holder 88 for mounting to different component sizes (widths) of different electric machines 12, the stand holder 88 is preferably adjustable in length, as shown with the screwing knob 102 to block the sliding of an inner rectangular bar 104 inside a rectangular outer bar 106. Typical two-part clamps 108, 110 are provided to attach to respective bars 104, 106 are adapted to be secured to tubular sections of the handles 13, or the like component, of the electric machine 12.

Figure 5:
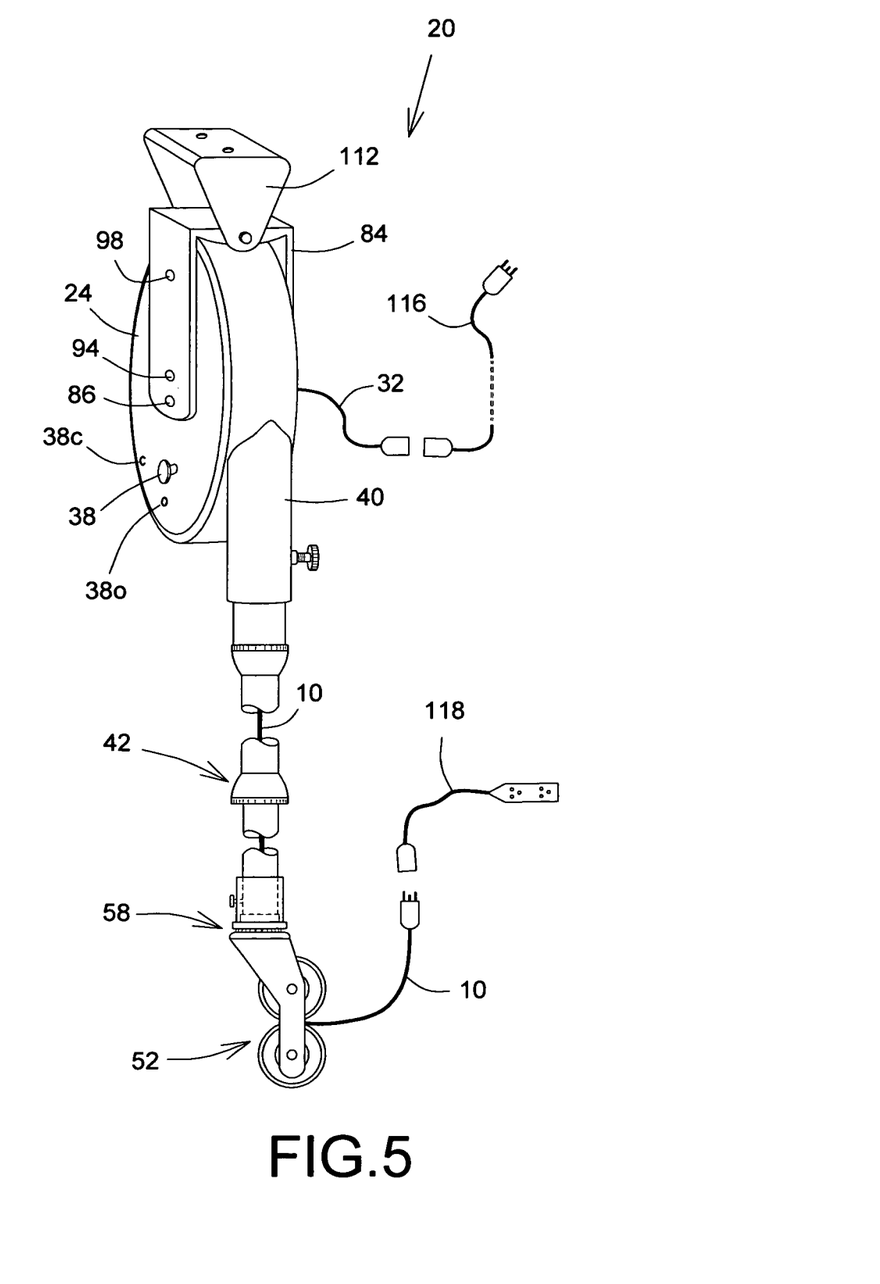

Alternatively, as illustrated in FIG. 5, the embodiment 20 of the 360-degree freedom electric cord device could be detached from the electric machine 12 and suspended from a wall (not shown) or up-side-down from a ceiling using a adaptor fixture 112 connecting to the base of the U-shape of the mounting bracket 84, or simply standing on the floor using an optional mounting base 114 (see FIG. 2) attachable to the stand holder 88 or the like. In such a configuration, the proximal machine power cord 32 connects to a conventional wall outlet (not shown) using a male-male plug adaptor cord 116, and the distal end of the power cord 10 connects female-female plug adaptor cord 118 to enable any electric hand tool (not shown) or the like to be connected thereto, and therefore use the device 20 as a standard electric retractable extension cord reel, with the ratchet mechanism 36 (which may be of a different design than the one of the embodiment 20 of FIG. 2) in operation and the spool member 26 in a closed configuration 36c. These plug adaptor cords 116, 118, and more specifically the female-female plug adaptor cord 118, may include internal protective circuit breaker (not shown) well known in the art. The device 20 could also be similarly used as an extension reel even while remaining attached to the electric machine 12 (but electrically disconnected from the power cord 34 thereof), itself positioned adjacent a conventional wall outlet.

Figures 6, 7:
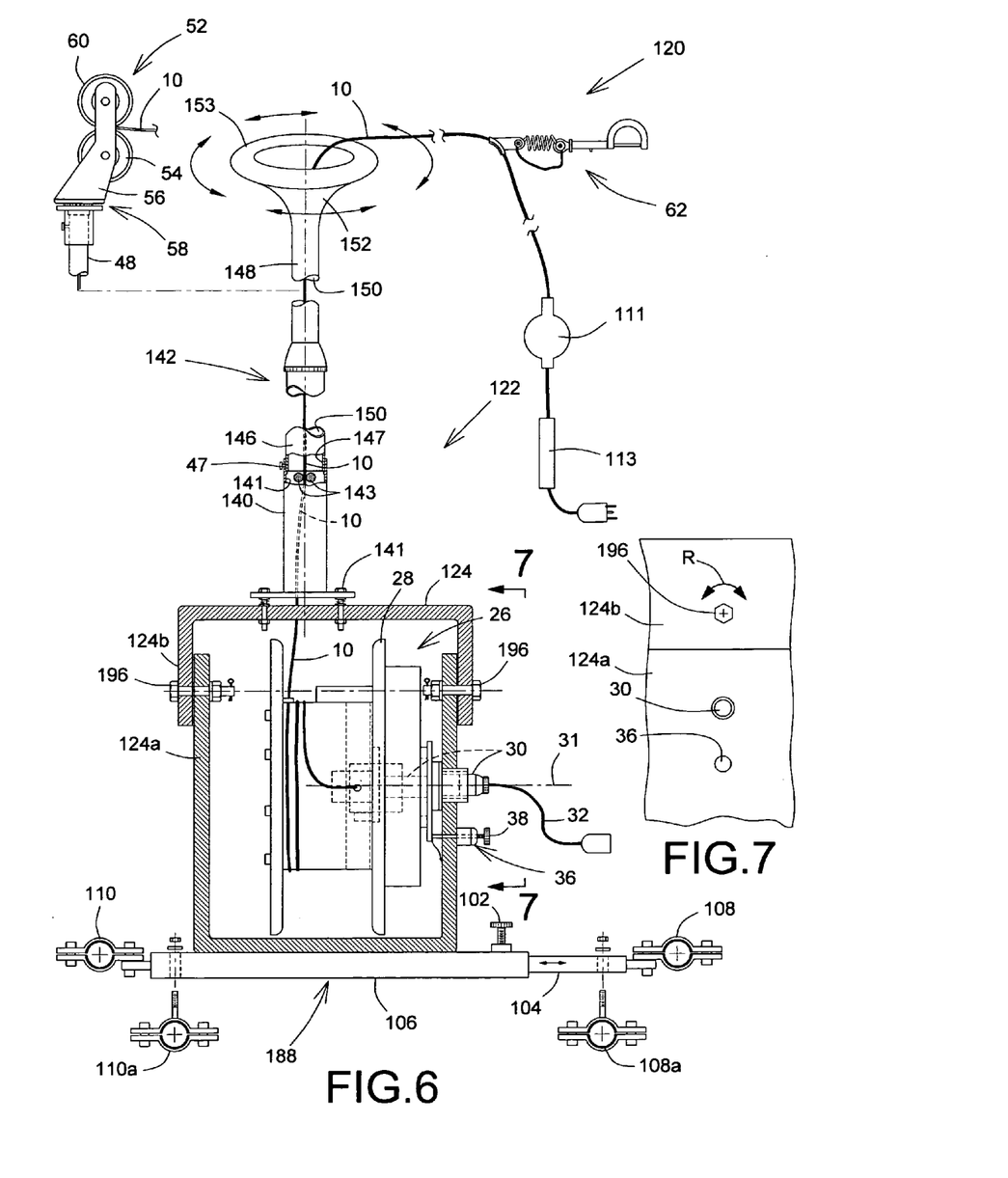
FIG. 6 is a partially broken and partially sectioned exploded elevation view of a second embodiment of a 360-degree freedom electric cord device in accordance with the present invention.
FIG. 7 is a partially broken view taken along line 7-7 of FIG. 6.

Referring now more specifically to FIGS. 6 through 10, there is schematically shown a second embodiment of 360-degree freedom electric cord device, shown generally as 120, for receiving an electric power cord or cable 10, and substantially allowing the same freedom represented by arrows A, B, C, D, and T. In this embodiment 120, a lower section 124a of the main housing 124 of the housing member 122 is typically directly mounted onto the stand holder 188, and an upper section 124b of the main housing 124 is typically pivotally mounted on the lower section 124a to pivot (as shown by arrow R in FIG. 7) about the axis of coaxial bolts 196 extending through corresponding bores of the lower section 124a and of the upper section 124a, as shown in FIGS. 6 and 7.

In the case the tubular sections of the handles 13, or the like component, of the electric machine 12 are closer from one another, the stand holder 188 could be used with additional two-part clamps 108a, 110a connectable under the respective free ends of the two rectangular bars 140, 106 of the stand holder 188.

The hollow cord access branch 140, with cord access opening 41, of the main housing 124 is connected thereto using bolt fasteners 141, and typically includes a pair of parallel rollers 143 freely rotatably mounted thereon and sufficiently spaced form one another to allow the unrestricted passage of the power cord 10 there between. The proximal post member end 146 of the post member 142 includes slot channels 147 extending axially partially there along to clear the rollers 143 when inserted into the cord access opening 41.

The distal post member end 148, best suited to guide medium to large gauge (low and heavy duty—mostly commercial and/or industrial grade) power cords 10, includes a cord guiding member 152 being an outwardly enlarging diameter of the through bore 150 that extends away from the first proximal post member end 146. Typically, the outwardly enlarging diameter 152 forms a bell-shaped (as the bell of a trumpet or trombone, or tubate or concave conical shape (one-sheeted hyperboloid shape)) second post member end 148, and the bell-shape typically includes an outwardly rounded edge 153 to ensure a smooth radial frictional sliding and unrestricted tangential rolling of the power cord 10 thereon as to be continuously oriented towards the cord holder member 62, as well as to allow a frictionless generally axial sliding of the cord along the internal wall of the bell-shaped end 148, without altering and/or damaging and/or even causing any wear to the power cord.

In order to prevent the distal end portion of the power cord 10 from inadvertently entering into the through bore 150 of the post member 142 when detached from the cord holder member 62, a removable ball-shaped stopper 111 is secured on the power cord 10.

Although not specifically described, the embodiments 20, 120 can be used either indoor or outdoor depending of the waterproofness or water sealing of the different components thereof, and especially the main housing 24, 124, or the spool member 26, having the electrical components therein, as the conventional reel electrical power interface (not shown) and the like, as well as the mechanical movable parts, as the self-retracting spool member 26, the ratchet mechanism 36 and the like.

Figure 8:
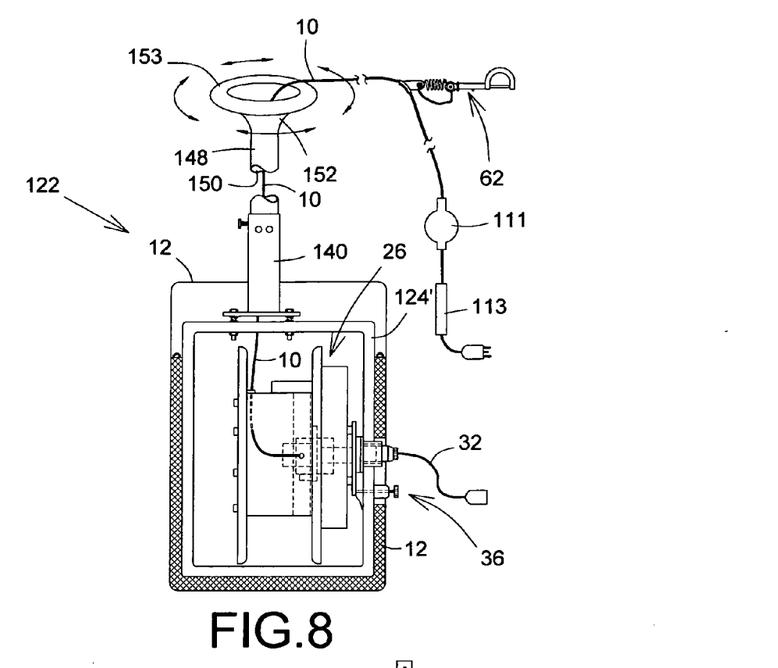
FIG. 8 is a partially broken elevation view of the embodiment of FIG. 6 mounted inside a push/pull-type electric machine.

Even though the embodiments 20, 120 are shown as being retrofitted onto existing on the different push/pull-type electric machines 12, they could be permanently installed therein by the machine manufacturer or the like without departing from the scope of the present invention, as represented in FIG. 8 with the main housing 124' being inside a hatched section representing a portion of a section of the body of the machine 12.

Figure 9:
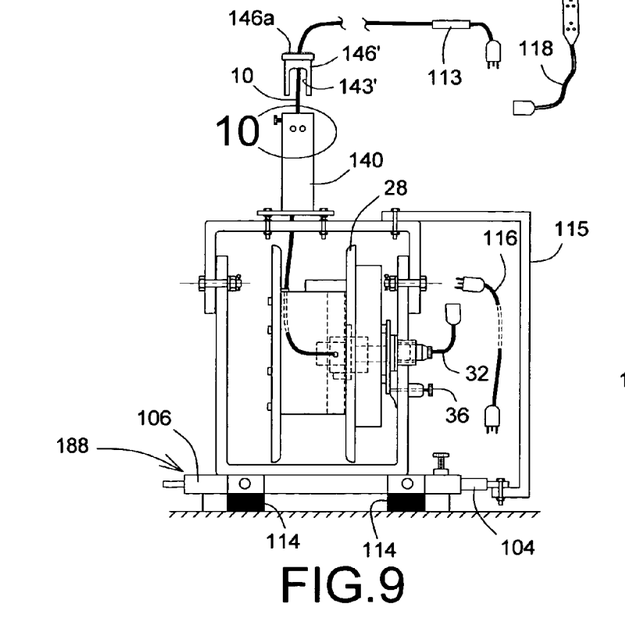
FIG. 9 is an elevation view of the embodiment of FIG. 6, with components removed for laying on a surface using a mounting base.
Figure 10:
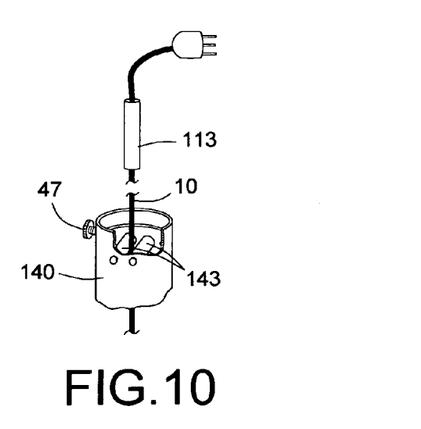
FIG. 10 is a partially broken enlarged perspective view taken along line 10 of FIG. 9.

FIG. 9 represents the embodiment 120 being used as a standard electric retractable extension cord reel, preferably with the ratchet mechanism 36 in operation and the spool member 26 in a closed configuration 36c, detached form the electric machine 12, and in which the post member 142 has been removed from the cord access branch 140 of the main housing 124, and the removable ball-shaped stopper 111 from the power cord 10, the latter not being required in this configuration since the pair of rollers 143 prevent either a narrower permanent stopper 113 or even the plug of the distal end of the power cord 10 from getting into the spool 28 (as shown in FIG. 10). In order to prevent the power cord 10 from getting worn out when sliding in and out, and around the cord access branch 140, a hollow extension adaptor outlet 146' is typically inserted into the cord access branch 140 with notches 143' clearing rollers 143 to allow the power cord 10 to freely roll on partially exposed balls 146*a* located all along the periphery of the free opening thereof. As for the other embodiment 20, a female-female plug adaptor cord 118, or the like is required to allow the electrical connection of a typical hand tool (not shown), and a male-male plug adaptor cord 116, or the like is also required to allow the electrical connection of the proximal machine power cord 32 to a conventional wall outlet 64 (see FIG. 1). In this configuration, the stand holder 188 is typically mounted on the optional mounting base 114, and further includes a protective side cover 115 securable to a structure wall (not shown).

Although not specifically illustrated herein, the different components, such as the housing members 24, 124, post members 42, 142 and cord guide members 52, 152 of the two embodiments 20, 120 could be interchanged without departing from the scope of the present invention, as partially schematically represented in FIGS. 2 and 6.

Although the present 360-degree freedom electric cord device and system has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

We claim:

1. A 360-degree freedom electric cord device for receiving an electric cord and for using with an electric machine being moved on a surface by an operator pushing and pulling the electric machine, said device comprising:
   a housing member attachable to the electric machine and having a self-retracting spool member for housing a first end portion of an electric cord electrically connectable to the electric machine;
   an elongated post member defining a substantially vertical post member axis and first and second post member ends longitudinally opposed from one another, said first post member end mounting on the housing member, said post member having a through bore extending therealong between said first and second post member ends for receiving a central portion of the electric cord therein, said second post member end having a cord guiding member allowing the electric cord to extend substantially radially therefrom and to freely rotate over a 360-degree span angle about the post member axis; and
   a cord holder member attachable to a fixed structure spaced from the housing member and the electric machine for attaching a second end portion of the electric cord to the fixed structure and spaced from said post member, said cord holder member including a cord state holder mechanism preventing torsion twisting of the electric cord and keeping the electric cord in tension between said post member and the fixed structure, said cord holder member having opposite ends attaching to the fixed structure and to the electric cord, respectively.

2. The device of claim 1, wherein the post member is adjustable in length.

3. The device of claim 1, wherein the cord guiding member is an outwardly enlarging diameter of said through bore at said second post member end in a direction extending away from said first post member end.

4. The device of claim 3, wherein the outwardly enlarging diameter of said through bore at said second post member end forms a bell-shaped second post member end.

5. The device of claim 4, wherein the bell-shaped second post member end includes an outwardly rounded edge.

6. The device of claim 1, wherein the cord guiding member includes a cord pulley freely rotatably mounted on a hollow bracket swiveling on said post member about said post member axis, said cord pulley being located radially away from said post member axis and within a pulley plane including said post member axis.

7. The device of claim 6, wherein the cord guiding member includes a pulley cord guide adjacent said cord pulley for maintaining the electric cord circumferentially in contact therewith.

8. The device of claim 7, wherein the cord pulley is a first cord pulley, the pulley cord guide being a second cord pulley freely rotatably mounted on said hollow bracket adjacent said first cord pulley for operatively receiving the electric cord therebetween such that each said cord pulley being said pulley cord guide for the other said cord pulley, said first and second cord pulleys being within said pulley plane.

9. The device of claim 1, wherein the housing member includes a main housing containing said self-retracting spool member therein and attaching to a mounting bracket, said mounting bracket mounting on a stand holder for attachment to a displaceable electric machine.

10. The device of claim 9, wherein the mounting bracket is pivotally mounted on the stand holder about an axis generally parallel to a spool axis of said self-retracting spool member for angular adjustment relative thereto so as to allow said post member axis to remain in a generally vertical orientation when said stand holder is attached to the displaceable electric machine.

11. The device of claim 10, wherein the stand holder is adjustable in length.

12. The device of claim 10, wherein the self-retracting spool member includes a spool freely rotatable on a fixed spool shaft with a torsion spring therebetween, whereby said torsion spring always maintaining a tension into an electric cord wound therearound.

13. The device of claim 12, wherein the self-retracting spool member includes a selectively operable ratcheting mechanism mounted between said main housing and said spool, and connecting thereto, to selectively restrain rotation of said spool into one direction allowing unwinding of an electric cord wound therearound, said ratcheting mechanism selectively preventing operation of said torsion spring.

14. The device of claim 9, wherein the main housing is a waterproof housing.

15. The device of claim 1, wherein the cord holder member includes a cord clamp member for clamping on an electric cord, and a securing member for releasable securing of said cord holder member to a structure, said cord clamp member connecting to the securing member via the cord state holder member.

16. The device of claim 15, wherein the cord state holder member includes a helical tension spring having opposite ends connecting to said cord clamp member and said securing member.

17. The device of claim 16, wherein the cord state holder member includes a tension limiter having opposite ends connecting to said cord clamp member and said securing member, said tension limiter being mounted in parallel to said helical tension spring.

18. The device of claim 16, wherein the cord state holder member includes a generally flexible spring cover housing said helical tension spring therein.

19. The device of claim 15, wherein the securing member includes a fastener for releasable fastening to a structure.

20. The device of claim 19, wherein the fastener is a hook or a suction cup.

21. A 360-degree freedom electric cord system for using with an electric machine being moved on a surface by an operator pushing and pulling the electric machine, said system comprising:
- a housing member attachable to the electric machine and having a self-retracting spool member housing a first end portion of an electric cord electrically connectable to the electric machine;
- an elongated post member defining a substantially vertical post member axis and first and second post member ends longitudinally opposed from one another, said first post member end mounting on the housing member, said post member having a through bore extending therealong between said first and second post member ends receiving a central portion of the electric cord therein, said second post member end having a cord guiding member allowing the electric cord to extend substantially radially therefrom and to freely rotate over a 360-degree span angle about the post member axis; and
- a cord holder member attachable to a fixed structure spaced from the housing member and the electric machine and attaching a second end portion of the electric cord to the fixed structure and spaced from said post member, said cord holder member including a cord state holder mechanism preventing torsion twisting of the electric cord and keeping the electric cord in tension between said post member and the fixed structure, said cord holder member having opposite ends attaching to the fixed structure and to the electric cord, respectively.

22. A push/pull-type electric machine being movable on a surface by an operator pushing and pulling the electric machine, said electric machine comprising a 360-degree freedom electric cord device, said device including:
- a housing member attachable to the electric machine and having a self-retracting spool member housing a first end portion of an electric cord to power the electric machine;
- an elongated post member defining a substantially vertical post member axis and first and second post member ends longitudinally opposed from one another, said first post member end mounting on the housing member, said post member having a through bore extending therealong between said first and second post member ends receiving a central portion of the electric cord therein, said second post member end having a cord guiding member allowing the electric cord to extend substantially radially therefrom and to freely rotate over a 360-degree span angle about the post member axis; and
- a cord holder member attachable to a fixed structure spaced from the housing member and the electric machine and attaching a second end portion of the electric cord to the fixed structure and spaced from said post member, said cord holder member including a cord state holder mechanism preventing torsion twisting of the electric cord and keeping the electric cord in tension between said post member and the fixed structure, said cord holder member having opposite ends attaching to the fixed structure and to the electric cord, respectively.

* * * * *